(12) United States Patent
Jin et al.

(10) Patent No.: US 10,747,018 B2
(45) Date of Patent: Aug. 18, 2020

(54) STEREOSCOPIC DISPLAY DEVICE HAVING A BARRIER PANEL

(71) Applicant: LG DISPLAY CO., LTD., Seoul (KR)

(72) Inventors: You-Yong Jin, Seoul (KR); Wook Jeon, Daejeon (KR); Hee-Jin Im, Paju-si (KR); Yong-Ku Lee, Gimpo-si (KR); Ju-Hoon Jang, Paju-si (KR); Dong-Yeon Kim, Seoul (KR); Woon-Chan Moon, Daegu (KR)

(73) Assignee: LG DISPLAY CO., LTD., Seoul (KR)

( * ) Notice: Subject to any disclaimer, the term of this patent is extended or adjusted under 35 U.S.C. 154(b) by 43 days.

(21) Appl. No.: 16/123,502

(22) Filed: Sep. 6, 2018

(65) Prior Publication Data

US 2019/0072774 A1    Mar. 7, 2019

(30) Foreign Application Priority Data

Sep. 7, 2017 (KR) .......................... 10-2017-0114734

(51) Int. Cl.
*G02B 27/22* (2018.01)
*G02B 30/27* (2020.01)
*H04N 13/366* (2018.01)
*G02F 1/1343* (2006.01)
*G09G 3/00* (2006.01)
(Continued)

(52) U.S. Cl.
CPC ............. *G02B 30/27* (2020.01); *G02B 30/25* (2020.01); *G02F 1/1343* (2013.01); *G09G 3/003* (2013.01); *H04N 13/315* (2018.05); *H04N 13/366* (2018.05); *G09G 2300/0426* (2013.01);
(Continued)

(58) Field of Classification Search
CPC ...... G02B 30/27; G02B 30/25; H04N 13/315; H04N 13/366; G09G 3/003; G09G 2354/00; G09G 2300/0426; G09G 2320/068; G09G 2320/0223; G09G 3/20; G02F 1/1343; G02F 1/136286
See application file for complete search history.

(56) References Cited

U.S. PATENT DOCUMENTS 10,120,197 B2 * 11/2018 Ochiai ................... G02F 1/1347
10,168,541 B2 * 1/2019 Ochiai ................... G02B 30/27
(Continued)

FOREIGN PATENT DOCUMENTS

CN          103163650 A      6/2013
JP          2005-70353 A     3/2005
(Continued)

*Primary Examiner* — Howard D Brown, Jr.
(74) *Attorney, Agent, or Firm* — Birch, Stewart, Kolasch & Birch, LLP

(57) ABSTRACT

A stereoscopic display device having a barrier panel is provided. The barrier panel can include channel electrodes to form transmitting regions and blocking regions in an active area, and link lines to provide a signal to the channel electrodes. The stereoscopic display device can include a display driver driving a display panel; a barrier panel on the display panel, the barrier panel including channel electrodes across an active area, and link lines disposed outside the active area; and a barrier driver controlling the channel electrodes through the link lines, wherein the number of the link lines in which each channel electrode crosses, is constant. Thus, in the stereoscopic display device, a dark spot due to a load deviation of the channel electrodes can be prevented.

15 Claims, 6 Drawing Sheets

(51) Int. Cl.
*H04N 13/315* (2018.01)
*G02B 30/25* (2020.01)
(52) U.S. Cl.
CPC ............... *G09G 2320/0223* (2013.01); *G09G 2320/068* (2013.01); *G09G 2354/00* (2013.01)

(56) References Cited

U.S. PATENT DOCUMENTS

| | | | |
|---|---|---|---|
| 10,656,430 B2* | 5/2020 | Jin | G02B 30/25 |
| 2009/0153653 A1* | 6/2009 | Lee | G02B 3/14 |
| | | | 348/59 |
| 2013/0057575 A1* | 3/2013 | An | H04N 13/356 |
| | | | 345/619 |
| 2013/0226094 A1* | 8/2013 | Ahmed | A61B 17/3468 |
| | | | 604/164.04 |
| 2013/0229327 A1 | 9/2013 | Lee | |
| 2014/0160378 A1* | 6/2014 | Moon | G02B 30/27 |
| | | | 349/15 |
| 2014/0226094 A1* | 8/2014 | Lee | G02F 1/13471 |
| | | | 349/15 |
| 2015/0036212 A1 | 2/2015 | Jeong et al. | |
| 2016/0004126 A1* | 1/2016 | Leister | G02F 1/134363 |
| | | | 349/123 |
| 2016/0004128 A1 | 1/2016 | Wu | |
| 2016/0037155 A1* | 2/2016 | Yoshino | G02F 1/1347 |
| | | | 348/51 |
| 2016/0261859 A1* | 9/2016 | Murao | G02F 1/1347 |
| 2016/0291358 A1* | 10/2016 | Kikuchi | G02F 1/133308 |
| 2017/0045763 A1* | 2/2017 | Murao | H04N 13/366 |
| 2018/0144671 A1* | 5/2018 | Li | G09G 3/36 |
| 2018/0299685 A1* | 10/2018 | Jin | H04N 13/373 |
| 2019/0079307 A1* | 3/2019 | Jin | H04N 13/366 |

FOREIGN PATENT DOCUMENTS

| | | |
|---|---|---|
| JP | 2011-209346 A | 10/2011 |
| JP | 2016-191890 A | 11/2016 |
| JP | 2016-191894 A | 11/2016 |
| KR | 10-2007-0023489 A | 3/2007 |
| KR | 10-2010-0048819 A | 5/2010 |
| KR | 10-2013-0101236 A | 9/2013 |
| KR | 10-2015-0026029 A | 3/2015 |
| KR | 10-2016-0028626 A | 3/2016 |
| WO | WO 2012/144434 A1 | 10/2012 |
| WO | WO 2015/059996 A1 | 4/2015 |
| WO | WO 2015/072193 A1 | 5/2015 |
| WO | WO 2015/162995 A1 | 10/2015 |

* cited by examiner

STEREOSCOPIC DISPLAY DEVICE HAVING A BARRIER PANEL

CROSS-REFERENCE TO RELATED APPLICATION

This application claims the priority benefit of Korean Patent Application No. 10-2017-0114734, filed in the Republic of Korea on Sep. 7, 2017, which is hereby incorporated by reference as if fully set forth herein.

BACKGROUND OF THE INVENTION

Field of the Invention

The present invention relates to a stereoscopic display device realizing a stereoscopic image by using a barrier panel.

Discussion of the Related Art

Generally, a display device includes a display panel which realizes an image. For example, the display device can include a liquid crystal panel having a liquid crystal, and/or an OLED (organic light emitting diode) panel having an organic light-emitting element.

The display device can realize a stereoscopic image using a position difference of a viewer's eyes. For example, a stereoscopic display device can differently provide an image realized by the display panel to the left eye and the right eye of the viewer, using the binocular disparity.

The stereoscopic display device can be an eyeglasses type using a shutter, and a non-glasses type using a barrier panel. The barrier panel can separate the image provided to the left eye and the right eye of the viewer using a path difference of light emitted from the display panel. For example, the barrier panel can form transmitting regions and blocking regions by adjusting voltage applied to channel electrodes which are disposed at regular intervals. The blocking regions can be disposed between the transmitting regions.

The barrier panel can include link lines for supply signals to the channel electrodes. Each of the channel electrodes can form a closed loop with the corresponding link line in order to prevent luminance deviation due to voltage drop.

The barrier panel can shift a proper viewing range for a stereoscopic image according to a location of the viewer. For example, the barrier panel can move the transmitting regions and the blocking regions according to the location of the viewer, by individually adjusting the voltage applied to each channel electrode.

However, when the number of the channel electrodes in the barrier panel can be increased to smoothly move the proper viewing range according to the location of the viewer, the number of the link lines for applying the signal to the channel electrodes can be increased. Thus, in the stereoscopic display device, a size of a peripheral area which is disposed outside of the active area can be increased, so that the entire size of the barrier panel can be increased. And, when the number of the channel electrodes and the number of the link lines are increased, the connection between the channel electrodes and the link lines can be complicated, and a deviation can occur in a load of the channel electrodes due to the link lines. Therefore, in the stereoscopic display device according to the related art, a dim line or a dark line due to the load deviation of the channel electrode can occur.

SUMMARY OF THE INVENTION

Accordingly, the present invention is directed to a stereoscopic display device that substantially obviates one or more problems due to limitations and disadvantages of the related art.

An object of the present invention is to provide a stereoscopic display device capable of minimizing a size of a peripheral area disposed outside of an active area in which transmitting regions and blocking regions are formed by channel electrodes.

Another object of the present invention is to provide a stereoscopic display device capable of preventing the occurrence of a dim line or a dark line due to load deviation of the channel electrodes.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a stereoscopic display device including a display driver which drives a display panel, and a barrier panel which is disposed on the display panel, wherein the barrier panel includes channel electrodes and link lines, the channel electrodes cross an active area, the link lines are disposed outside of the active area, and the link lines are connected to a barrier driver. The stereoscopic display device further includes the barrier driver which controls the channel electrodes through the link lines. The number of the link lines in which each channel electrode crosses can be the same.

The link lines can be connected to the channel electrodes, individually.

The link lines can include first link lines and second link lines. The first link lines can be connected to an end portion of the channel electrodes. The second link lines can be connected to another end portion of the channel electrodes. The number of the first link lines in which each channel crosses, can be inversely proportion with the number of the second link lines intersecting the corresponding channel electrode.

The second link lines can include a region parallel with the channel electrodes on a side of the active region.

The barrier panel can further include trigger electrodes between the channel electrodes. The number of link lines in which each trigger electrode intersects can be different from the number of link lines in which each channel electrode intersects.

The number of link lines in which each trigger electrode intersects can be larger than the number of link lines in which each channel electrode intersects.

A first trigger electrode and a second trigger electrode can be disposed side by side between the adjacent two channel electrodes. The number of the link lines in which the second trigger electrode intersects can be different from the number of the first trigger electrode intersects.

A location of the viewer can be detected by a viewing location detecting part. A barrier driver can adjust the signal applied to the channel electrodes through the link lines according to the signal of the viewing location detecting part.

The display panel can include a lower display substrate, a lower emission electrode, a light-emitting layer, an upper emission electrode and an upper display substrate, which are sequentially stacked.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Figure 1:
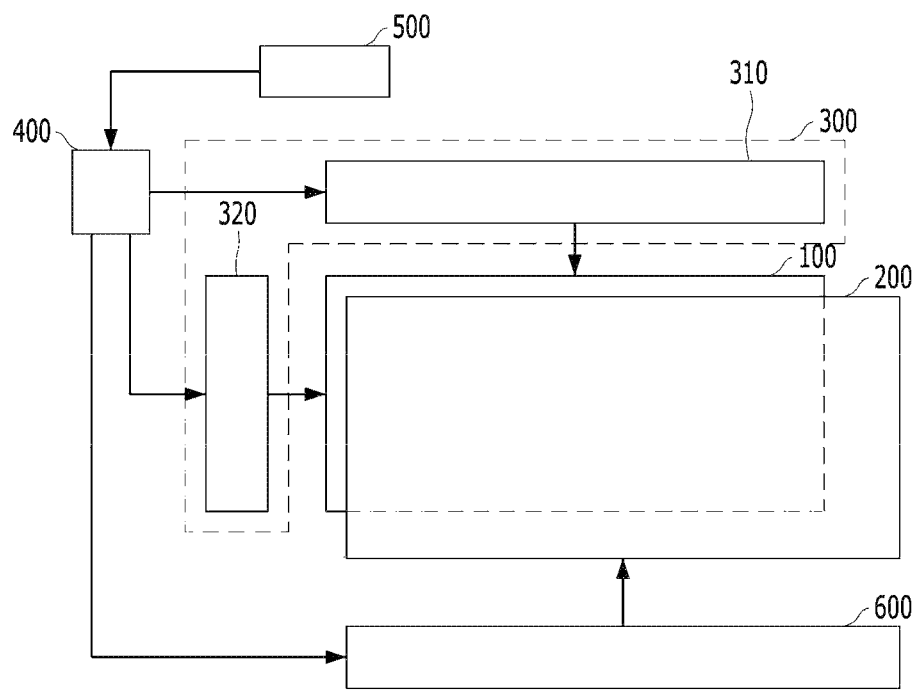
FIG. 1 is a view schematically showing a stereoscopic display device according to an embodiment of the present invention.

Hereinafter, details related to the above objects, technical configurations, and operational effects of the embodiments of the present invention will be clearly understood by the following detailed description with reference to the drawings, which illustrate some embodiments of the present invention. Here, the embodiments of the present invention are provided in order to allow the technical sprit of the present invention to be satisfactorily transferred to those skilled in the art, and thus the present invention can be embodied in other forms and is not limited to the embodiments described below.

In addition, the same or extremely similar elements can be designated by the same reference numerals throughout the specification, and in the drawings, the lengths and thickness of layers and regions can be exaggerated for convenience. It will be understood that, when a first element is referred to as being "on" a second element, although the first element can be disposed on the second element so as to come into contact with the second element, a third element can be interposed between the first element and the second element.

Here, terms such as, for example, "first" and "second" can be used to distinguish any one element with another element. However, the first element and the second element can be arbitrary named according to the convenience of those skilled in the art without departing the technical sprit of the present invention.

The terms used in the specification of the present invention are merely used in order to describe particular embodiments, and are not intended to limit the scope of the present invention. For example, an element described in the singular form is intended to include a plurality of elements unless the context clearly indicates otherwise. In addition, in the specification of the present invention, it will be further understood that the terms "comprises" and "includes" specify the presence of stated features, integers, steps, operations, elements, components, and/or combinations thereof, but do not preclude the presence or addition of one or more other features, integers, steps, operations, elements, components, and/or combinations thereof.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Embodiments

Figure 2A:
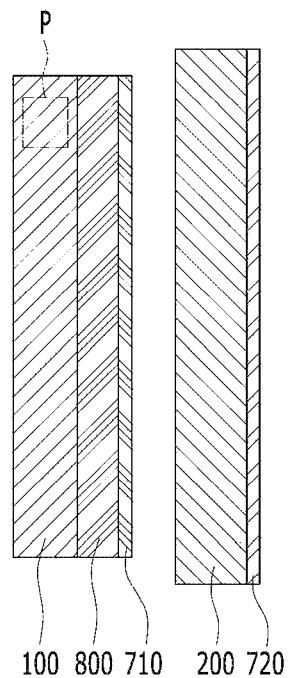
FIG. 2A is a view showing a display panel and a barrier panel of the stereoscopic display device according to the embodiment of the present invention.
Figure 2B:
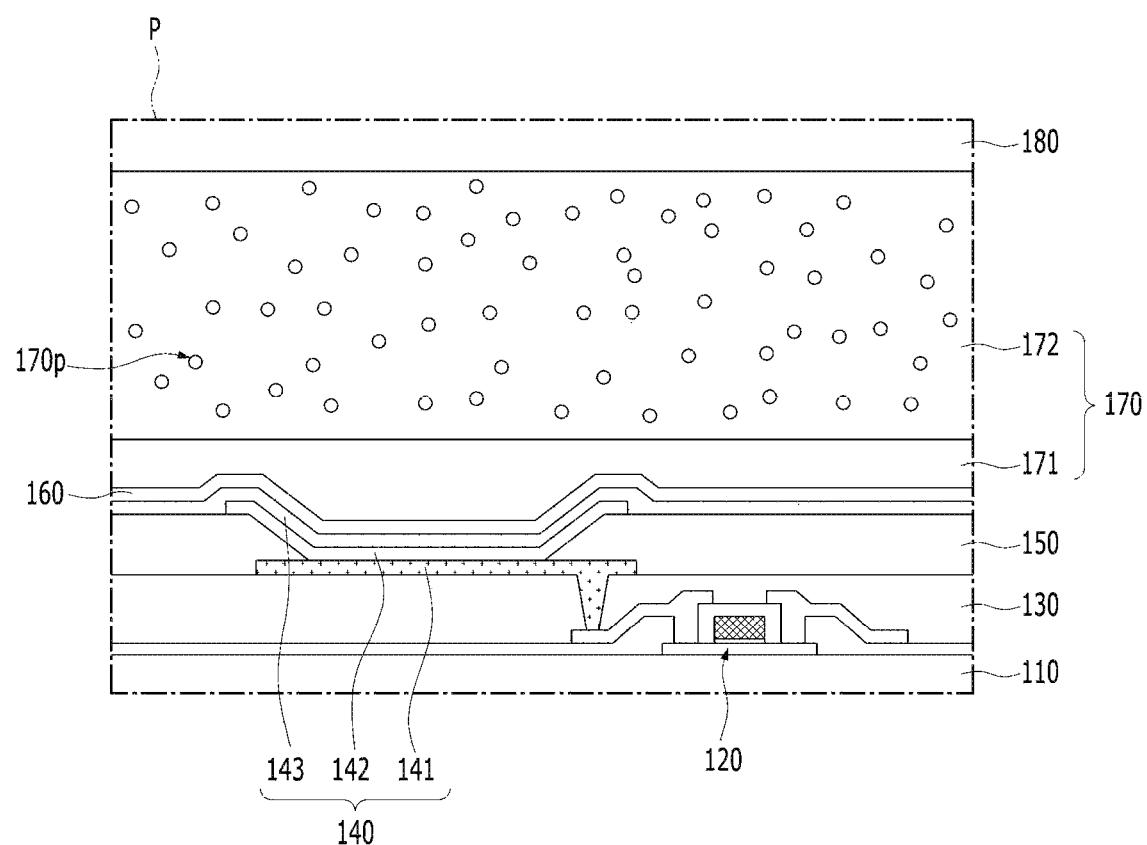
FIG. 2B is an enlarged view of P region in FIG. 2A.

FIG. 1 is a view schematically showing a stereoscopic display device according to an embodiment of the present invention. FIG. 2A is a view showing a display panel and a barrier panel of the stereoscopic display device according to the embodiment of the present invention. FIG. 2B is an enlarged view of P region in FIG. 2A. All the components of the stereoscopic display device according to all embodiments of the present invention are operatively coupled and configured.

Referring FIGS. 1, 2A and 2B, the stereoscopic display device according to the embodiment of the present invention can include a display panel 100, a barrier panel 200, a display driver 300, a timing controller 400, a viewer location detecting part 500 and a barrier driver 600.

The display panel 100 can realize an image which is provided to a viewer. For example, the display panel 100 can include a lower display substrate 110, a plurality of light-emitting elements 140 and an upper display substrate 180, which are sequentially stacked. The light-emitting element 140 can generate light displaying a specific color to realize the image. For example, the light-emitting element 140 can include a lower emission element 141, a light-emitting layer 142 and an upper emission element 143, which are sequentially stacked. The light-emitting layer 142 can include an organic emission material or an inorganic emission material. For example, the display panel 100 of the stereoscopic display device according to the embodiment of the present invention can be an OLED panel including an organic light-emitting element.

The display panel 100 can further include plurality of thin film transistors 120. For example, each thin film transistor 120 can be disposed between the lower display substrate 110 and the light-emitting element 140. The display panel 100 can further include an over-coat layer 130 covering the thin film transistor 120, and a bank insulating layer 150 covering an edge of the lower emission electrode 141. The over-coat layer 130 can remove a thickness difference due to the thin film transistor 120. The light-emitting element 140 can be disposed on the over-coat layer 130. For example, the over-coat layer 130 can include a contact hole exposing drain electrode of the thin film transistor 120.

The display panel 100 can further include an upper passivation layer 160 and an adhesive layer 170 which are disposed between the light-emitting element 140 and the upper display substrate 180. The upper passivation layer 160 can prevent damage of the light-emitting element 140 due to the external impact and moisture. The adhesive layer 170 can be disposed between the upper passivation layer 160 and the upper display substrate 180. The upper display substrate 180 can be coupled to the lower display substrate 110 in which the upper passivation layer 160 is formed, by the adhesive layer 170. The adhesive layer 170 can have a multi-layer structure. For example, the adhesive layer 170 can include a lower adhesive layer 171 and an upper adhesive layer 172. The upper adhesive layer 172 can be disposed between the lower adhesive layer 171 and the upper display substrate 180. The upper adhesive layer 172 can include a moisture-absorbing material 170p. The lower adhesive layer 171 can relieve the stress applied to the light-emitting element 140 due to the expansion of the moisture-absorbing material 170p.

The barrier panel 200 can be disposed on the display panel 100. The barrier panel 200 can separate the image realized by the display panel 100 to provide the left eye and the right eye of the viewer. For example, the image realized by the display panel 100 can be stereoscopically recognized to the viewer by the barrier panel 200.

Figure 3A:
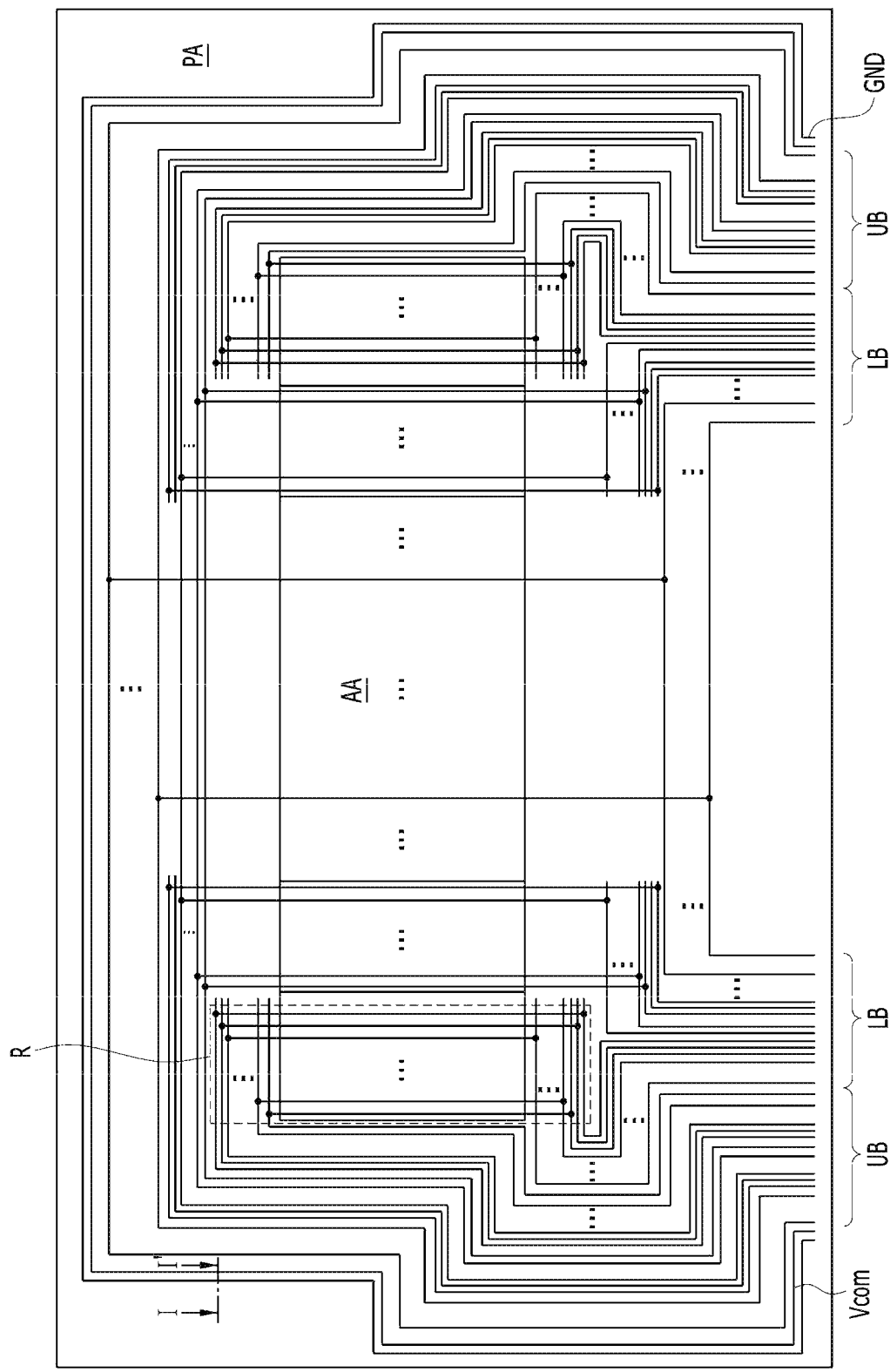
FIG. 3A is a view schematically showing a wiring lines on the barrier panel of the stereoscopic display device according to the embodiment of the present invention.
Figure 3B:
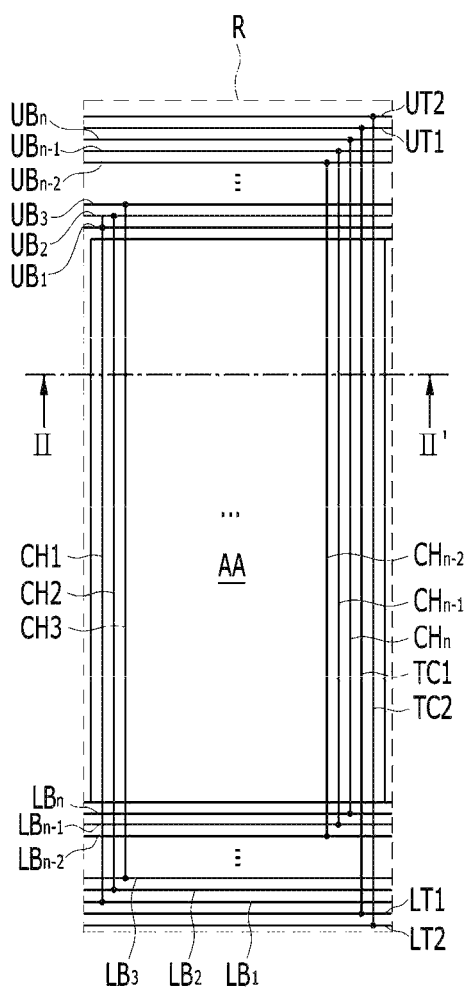
FIG. 3B is an enlarged view of R region in FIG. 3A.
Figure 3C:
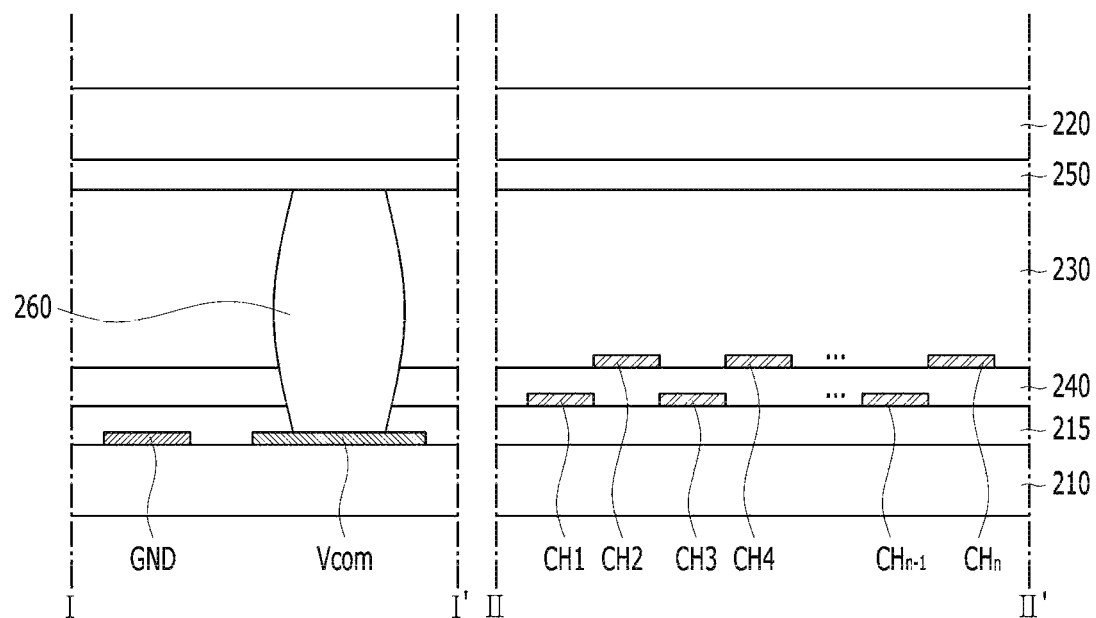
FIG. 3C is a view taken along I-I' of FIG. 3A and II-II' of FIG. 3B.

FIG. 3A is a view schematically showing a wiring lines on the barrier panel 200 of the stereoscopic display device according to the embodiment of the present invention. FIG. 3B is an enlarged view of R region in FIG. 3A. FIG. 3C is a view taken along I-I' of FIG. 3A and II-II' of FIG. 3B.

Referring FIGS. 1, 2A and 3A to 3C, the barrier panel 200 of the stereoscopic display device according to the embodiment of the present invention can include a lower barrier substrate 210, an upper barrier substrate 220, a liquid-crystal layer 230, channel electrodes CH1-CHn, a barrier insulating layer 240, a common electrode 250, and link lines LB1-LBn, UB1-UBn, LT1, LT2, UT1 and UT2, where n can be a positive integer.

The lower barrier substrate 210 and the upper barrier substrate 220 can include an insulating material. The lower barrier substrate 210 and the upper barrier substrate 220 can include a transparent material. For example, the lower barrier substrate 210 and the upper barrier substrate 220 can include glass.

The liquid crystal layer 230 can be disposed between the lower barrier substrate 210 and the upper barrier substrate 220. The liquid crystal layer 230 can include a liquid crystal rotated by an electric field which applied to the outside. For example, the liquid crystal in the liquid crystal layer 230 can be TN type or ECB (electrically controlled birefringence) type.

The channel electrodes CH1-CHn can be disposed between the lower barrier substrate 210 and the liquid crystal layer 230. The channel electrodes can be disposed at regular intervals. The channel electrodes can be insulated from each other by the barrier insulating layer 240. For example, the channel electrodes CH1-CHn can be a multi-layer structure separated by the barrier insulating layer 240. The barrier insulating layer 240 can include an insulating material. For example, the barrier insulating layer 240 can include silicon oxide or silicon nitride.

The barrier panel 200 can selectively transmit or block light. For example, the channel electrodes CH1-CHn can cross an active area AA in which transmitting regions and blocking regions are formed. The channel electrodes CH1-CHn can include a conductive material. The channel electrodes CH1-CHn can include a transparent material. For example, the channel electrodes CH1-CHn can be formed of ITO or IZO.

The common electrode 250 can be disposed between the liquid crystal layer 230 and the upper barrier substrate 220. For example, the common electrode 250 can be formed on the upper barrier substrate 220. The common electrode 250 can form a vertical electric field with the channel electrodes CH1-CHn. The liquid crystal in the liquid crystal layer 230 can be rotated according to the vertical electric field formed between the channel electrodes CH1-CHn and the common electrode 250. The transmitting regions and the blocking regions can be formed by the rotation of the liquid crystal according to signal applied to the corresponding channel electrode CH1-CHn.

The common electrode 250 can include a conductive material. The common electrode 250 can include a transparent material. For example, the common electrode 250 can be formed of ITO or IZO.

The link lines LB1-LBn, UB1-UBn, LT1, LT2, UT1 and UT2 can be disposed on a peripheral area PA which is disposed outside the active area AA. The link lines LB1-LBn, UB1-UBn, LT1, LT2, UT1 and UT2 can be connected to the channel electrode CH1-CHn. Each of the channel electrodes CH1-Chn can be connected to the barrier driver 600 through one of the link lines LB1-LBn, UB1-UBn, LT1, LT2, UT1 and UT2. For example, the link lines LB1-LBn, UB1-UBn, LT1, LT2, UT1 and UT2 can be connected to the channel electrodes CH1-CHn, individually.

The link lines LB1-LBn, UB1-UBn, LT1, LT2, UT1 and UT2 can include first link lines LB1-LBn, and second link lines UB1-UBn. The first link lines LB1-LBn can be connected to an end portion of the channel electrodes CH1-CHn. The second link lines UB1-UBn can be connected to another end portion of the channel electrodes CH1-CHn which is not connected to the first link lines LB1-LBn. For example, the end portion of the channel electrodes connected to the second link lines UB1-UBn can be opposite to the end portion of the channel electrodes connected to the first link lines LB1-LBn. The second link lines UB1-UBn can be extended along the active area AA. For example, the second link lines UB1-UBn can include a region parallel with the channel electrodes CH1-CHn on a side of the active area AA. A length of the first link lines LB1-LBn connected to an end portion of each channel electrode CH1-CHn can be shorter than a length of the second link lines UB1-UBn connected to another end portion of the corresponding channel electrode CH1-CHn. Thus, in the stereoscopic display device according to the embodiment of the present invention, a size of the peripheral area PA on which the link lines LB1-LBn, UB1-UBn, LT1, LT2, UT1 and UT2 are disposed, can be minimized. Therefore, in the stereoscopic display device according to the embodiment of the present invention, the shift of the transmitting regions and the blocking regions by the channel electrodes CH1-Chn can be efficiently performed.

The link lines LB1-LBn, UB1-UBn, LT1, LT2, UT1 and UT2 can intersect the channel electrodes CH1-CHn. The number of the link lines LB1-LBn, UB1-UBn, LT1, LT2, UT1 and UT2 in which each channel electrode CH1-CHn crosses, can be the same or constant. For example, the number of the first link lines LB1-LBn and the second link lines UB1-UBn across a first channel electrode CH1 can be the same as the number of the first link lines LB1-LBn and the second link lines UB1-UBn across a second channel electrode CH2 which is disposed close to the first channel electrode CH1. Thus, in the stereoscopic display device according to the embodiment of the present invention, the load deviation of the channels electrodes CH1-CHn can be prevented. Therefore, in the stereoscopic display device according to the embodiment of the present invention, the occurrence of the dim line or the dark line due to the load deviation can be prevented.

The number of the first link lines LB1-LBn across the first channel electrode CH1 can be different from the number of the first link lines LB1-LBn across the second channel electrode CH2. The number of the second link lines UB1-

UBn across the first channel electrode CH1 can be different from the number of the second link lines UB1-UBn across the second channel electrode CH2. For example, the number of the first link lines LB1-LBn in which each channel electrode CH1-CHn crosses can be inversely proportion to the number of the second link lines UB1-UBn intersecting the corresponding channel electrode CH1-CHn.

The link lines LB1-LBn, UB1-UBn, LT1, LT2, UT1 and UT2 can include a conductive material. The link lines LB1-LBn, UB1-UBn, LT1, LT2, UT1 and UT2 can a material having a relatively high conductivity. For example, the link lines LB1-LBn, UB1-UBn, LT1, LT2, UT1 and UT2 can include a metal, such as aluminum (Al).

The barrier panel 200 of the stereoscopic display device according to the embodiment of the present invention can further include trigger electrodes TC1 and TC2 which are disposed side by side between adjacent two channel electrodes in order to prevent the occurrence of a bright line or a dark line due to the shift of the transmitting regions and the blocking regions. The trigger electrodes TC1 and TC2 can be disposed between the channel electrodes CH1-CHn. For example, the trigger electrodes TC1 and TC2 can cross the active area AA.

The link lines LB1-LBn, UB1-UBn, LT1, LT2, UT1 and UT2 can further include trigger lines LT1, LT2, UT1 and UT2 connected to the trigger electrodes TC1 and TC2. The trigger lines LT1, LT2, UT1 and UT2 can include first trigger lines LT1 and LT2 connected to an end portion of the trigger electrodes TC1 and TC2, and second trigger lines UT1 and UT2 connected to another end portion of the trigger electrodes TC1 and TC2.

The number of the link lines LB1-LBn, UB1-UBn, LT1, LT2, UT1 and UT2 intersecting each trigger electrode TC1 and TC2 can be different from the number of the link lines LB1-LBn, UB1-UBn, LT1, LT2, UT1 and UT2 intersecting each channel electrodes CH1-CHn. For example, the trigger lines LT1, LT2, UT1 and UT2 can be disposed outside the link lines LB1-LBn and UB1-UBn connected to the channel electrodes CH1-CHn which form the transmitting regions and/or the blocking regions in a certain range of the active area AA. The number of the link lines LB1-LBn, UB1-UBn, LT1, LT2, UT1 and UT2 intersecting each trigger electrode TC1 and TC2 can be larger than the number of the link lines LB1-LBn, UB1-UBn, LT1, LT2, UT1 and UT2 intersecting each channel electrodes CH1-CHn. Thus, the stereoscopic display device according to the embodiment of the present invention can prevent an excessive load from being applied to the channel electrodes CH1-CHn by trigger lines LT1, LT2, UT1 and UT2. The number of the link lines LB1-LBn, UB1-UBn, LT1, LT2, UT1 and UT2 intersecting each trigger electrode TC1 and TC2 can be different from the number of the link lines LB1-LBn, UB1-UBn, LT1, LT2, UT1 and UT2 intersecting the trigger electrode TC1 and TC2 disposed adjacent the corresponding trigger electrode TC1 and TC2. For example, the number of the link lines LB1-LBn, UB1-UBn, LT1, LT2, UT1 and UT2 intersecting first trigger electrode TC1 can be different from the number of the link lines LB1-LBn, UB1-UBn, LT1, LT2, UT1 and UT2 intersecting second trigger electrode TC2 which is disposed close to the first trigger electrode TC1.

The barrier panel 200 of the stereoscopic display device according to the embodiment of the present invention can further include common voltage supply line Vcom and ground line GND which are disposed on the peripheral area PA. The common voltage supply line Vcom and the ground line GND can be disposed outside the link lines LB1-LBn, UB1-UBn, LT1, LT2, UT1 and UT2. For example, the common voltage supply line Vcom can be disposed between the ground line GND and the link lines LB1-LBn, UB1-UBn, LT1, LT2, UT1 and UT2.

The common voltage supply line Vcom and the ground line GND can include a material different from the channel electrodes CH1-CHn. For example, the common voltage supply line Vcom and the ground line GND can include a metal. The common voltage supply line Vcom and the ground line GND can include a material same as the link lines LB1-LBn, UB1-UBn, LT1, LT2, UT1 and UT2.

The barrier panel 200 of the stereoscopic display device according to the embodiment of the present invention can further include a barrier buffer layer 215 which covers the link lines LB1-LBn, UB1-UBn, LT1, LT2, UT1 and UT2, the common voltage supply line Vcom, and the ground line GND, and is extended between the lower substrate 210 and the channel electrodes CH1-CHn. The barrier buffer layer 215 can include an insulating material. For example, the barrier buffer layer 215 can be silicon oxide.

The common voltage supply line Vcom can be connected to the common electrode 250. For example, in the barrier panel 200 of the stereoscopic display device according to the embodiment of the present invention, a sealing member 260 for sealing the liquid crystal layer 230 can include a conductive material. The sealing member 260 can be in direct contact with the common electrode 250 and the common voltage supply line Vcom. The common electrode 250 can be connected to the common voltage supply line Vcom by the sealing member 260.

The display driver 300 can drive the display panel 100. The display panel 100 can receive signals for realizing the image from the display driver 300. For example, the display driver 300 can include a data driver 310 and a scan driver 320.

The data driver 310 can provide a data signal to the display panel 100. The scan driver 320 can sequentially apply a scan signal to the display panel 100. The data signal provided by the data driver 310 can be synchronized with the scan signal applied from the scan driver 320.

The timing controller 400 can provide a signal for the operation of the display driver 300. For example, the timing controller 400 can provide digital video data and source timing control signal to the data driver 310. The scan driver 320 can receive clock signals, reset clock signals and start signals from the timing controller 400.

The viewing location detecting part 500 can detect the location of the viewer. For example, the viewing location detecting part 500 can detect the position information of the viewer viewing the image realized by the display panel 100 and the barrier panel 200. The viewing location detecting part 500 can include a camera.

The barrier driver 600 can drive the barrier panel 200. For example, the barrier driver 600 can apply a voltage the channel electrode CH1-CHn through the link lines LB1-LBn, UB1-UBn, LT1, LT2, UT1 and UT2, individually. The barrier driver 600 can control the channel electrodes CH1-CHn of the barrier panel 200 according to the location of the viewer. For example, the barrier driver 600 can adjust the signal applied to the link lines LB1-LBn, UB1-UBn, LT1, LT2, UT1 and UT2 which are individually connected to channel electrodes CH1-CHn according to the signal of the viewing location detecting part 500.

Accordingly, in the stereoscopic display device according to the embodiment of the present invention, a size of the peripheral area PA of the barrier panel 200 can not increase greatly even when the number of the channel electrodes CH1-CHn is increased in order to smoothly move a proper viewing range for the stereoscopic image according to the location of the viewer. And, in the stereoscopic display device according to the embodiment of the present invention, the load deviation of the channel electrodes CH1-CHn can be prevented or minimized. Thus, in the stereoscopic display device according to the embodiment of the present invention, the occurrence of the dim line or the dark line due to the load deviation can be prevented or minimized. Therefore, in the stereoscopic display device according to the embodiment of the present invention, the process efficiency and the quality of the stereoscopic image can be improved.

The stereoscopic display device according to the embodiment of the present invention can include a structure for preventing the reflection of the external light. For example, the stereoscopic display device according to the embodiment of the present invention can further include a quarter-wave plate 800 between the display panel 100 and a front linear polarizer 710, as shown in FIG. 2A. The quarter-wave plate 800 can be in direct contact with the display panel 100 and the front linear polarizer 710. A rear linear polarizer 720 can be disposed on an outer surface of the barrier panel 200.

Figure 4:
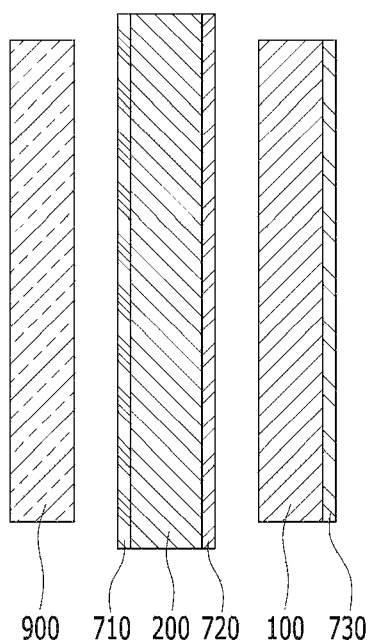
FIGS. 4 and 5 are views respectively showing the display device according to other examples of the present invention.

The stereoscopic display device according to the embodiment of the present invention is described that the barrier panel 200 is disposed on the display panel 100 including the light-emitting element 140. However, in the stereoscopic display device according to another embodiment of the present invention, the barrier panel 200 can be disposed between the display panel 100 and the light-emitting element 900, as shown in FIG. 4. For example, the display panel 100 of the stereoscopic display device according to another embodiment of the present invention can be a liquid crystal panel. The light-emitting element 900 can function as a backlight unit. A front linear polarizer 710 and a rear linear polarizer 720 can be in direct contact with the barrier panel 200. An image linear polarizer 730 can be disposed on an outer surface of the display panel 100. Thus, in the stereoscopic display device according to another embodiment of the present invention, the proper viewing range for the stereoscopic image can be smoothly moved according to the location of the viewer regardless of the relative position of the display panel 100 and the barrier panel 200.

Figure 5:
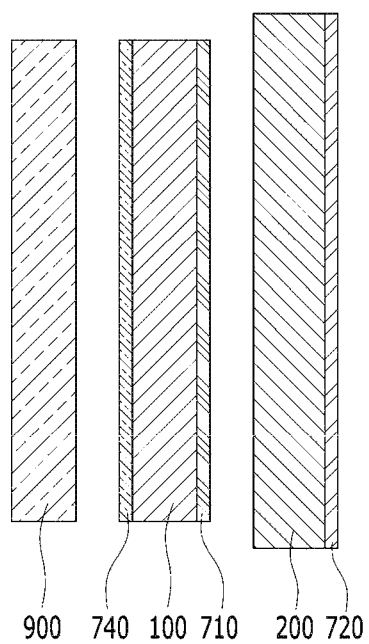

The stereoscopic display device according to another embodiment of the present invention is described that the barrier panel 200 is disposed between the light-emitting element 900 and the display panel 100. However, in the stereoscopic display device according to further another embodiment of the present invention, the display panel 100 can be disposed between the light-emitting element 900 and the barrier panel 200, as shown in FIG. 5. An image linear polarizer 740 can be disposed between the light-emitting element 900 and the display panel 100. The image linear polarizer 740 and the front linear polarizer 710 can be in direct contact with the display panel 100. A rear linear polarizer 720 can be disposed on an outer surface of the barrier panel 200. Thus, the stereoscopic display device according to further another embodiment of the present invention can smoothly provide the stereoscopic image to the moving viewer in the display panel 100 and the barrier panel 200 at various positions.

As a result, the stereoscopic display device according to the embodiments of the present invention can prevent the load deviation of the channel electrodes by adjusting the number of the link lines across each channel electrode to be the same. Also, in the stereoscopic display device according to the embodiments of the present invention, only the second link lines connected to an end portion of the channel electrodes which is different from an end portion connected the first link lines, can be extended along the active area. Thus, in the stereoscopic display device according to the embodiments of the present invention, the size of the peripheral area of the barrier panel can be minimized with prevention of the occurrence of the dim line due to the load deviation of the channel electrodes. Therefore, in the stereoscopic display device according to the embodiments of the present invention, the process efficiency and the quality of the stereoscopic image can be effectively increased.

What is claimed is:

1. A stereoscopic display device comprising:
   a display driver configured to drive a display panel;
   a barrier panel on the display panel, the barrier panel including channel electrodes across an active area, and link lines spaced away from the active area; and
   a barrier driver configured to control the channel electrodes through the link lines,
   wherein the channel electrodes are connected to the link lines at the outside of the active area, and
   wherein the number of the link lines in which each channel electrode crosses, is constant.

2. The stereoscopic display device according to claim 1, wherein the link lines are connected to the channel electrodes, individually.

3. The stereoscopic display device according to claim 1, wherein the link lines include first link lines connected to an end portion of the channel electrodes, and second link lines connected to another end portion of the channel electrodes, and
   wherein the number of the first link lines in which each channel electrode crosses, is inversely proportion to the number of the second link lines intersecting the corresponding channel electrode.

4. The stereoscopic display device according to claim 3, wherein the second link lines include a region parallel with the channel electrodes on a side of the active area.

5. The stereoscopic display device according to claim 1, wherein the barrier panel further includes trigger electrodes between the channel electrodes, and
   wherein the number of the link lines in which each trigger electrode crosses, is different from the number of the link lines intersecting each channel electrode.

6. The stereoscopic display device according to claim 5, wherein the number of the link lines intersecting each trigger electrode is larger than the number of the link lines intersecting each channel electrode.

7. The stereoscopic display device according to claim 5, wherein the trigger electrodes include a first trigger electrode and a second trigger electrode which are disposed side by side between adjacent two channel electrodes, and
   wherein the number of the link lines intersecting the second trigger electrode is different from the number of the link lines intersecting the first trigger electrode.

8. The stereoscopic display device according to claim 1, further comprising a viewing location detecting part configured to detect a location of a viewer,
   wherein the barrier driver controls a signal applied to the channel electrodes through the link lines according to a signal of the viewing location detecting part.

9. The stereoscopic display device according to claim 1, wherein the display panel includes a lower display substrate, a lower emission electrode, a light-emitting layer, an upper emission electrode and an upper display substrate, which are sequentially stacked.

10. The stereoscopic display device according to claim 3, wherein only the second link lines are extended along the active area.

11. The stereoscopic display device according to claim 1, further comprising a front linear polarizer, a rear linear polarizer and a quarter-wave plate,
   wherein the quarter-wave plate is in direct contact with the display panel and the front linear polarizer, and the rear linear polarizer is disposed on an outer surface of the barrier panel.

12. The stereoscopic display device according to claim 1, further comprising a front linear polarizer, a rear linear polarizer and an image linear polarizer,
   wherein the front linear polarizer and the rear linear polarizer are in direct contact with the barrier panel, and the image linear polarizer is disposed on an outer surface of the display panel.

13. The stereoscopic display device according to claim 1, further comprising a front linear polarizer, a rear linear polarizer and an image linear polarizer,
   wherein the image linear polarizer and the front linear polarizer are in direct contact with the display panel, and the rear linear polarizer is disposed on an outer surface of the barrier panel.

14. A stereoscopic display device comprising:
   a display driver configured to drive a display panel;
   a barrier panel on the display panel, the barrier panel including channel electrodes across an active area, and link lines disposed outside of the active area; and
   a barrier driver configured to control the channel electrodes through the link lines,
   wherein the number of the link lines in which each channel electrode crosses, is constant,
   wherein the barrier panel further includes trigger electrodes between the channel electrodes, and
   wherein the number of the link lines in which each trigger electrode crosses, is different from the number of the link lines intersecting each channel electrode.

15. A stereoscopic display device comprising:
   a display driver configured to drive a display panel;
   a barrier panel on the display panel, the barrier panel including channel electrodes across an active area, and link lines disposed outside of the active area; and
   a barrier driver configured to control the channel electrodes through the link lines,
   wherein the number of the link lines in which each channel electrode crosses, is constant, and
   wherein the display panel includes a lower display substrate, a lower emission electrode, a light-emitting layer, an upper emission electrode and an upper display substrate, which are sequentially stacked.

* * * * *